US011908321B2

(12) United States Patent
Guo

(10) Patent No.: US 11,908,321 B2
(45) Date of Patent: Feb. 20, 2024

(54) REGIONAL DYNAMIC PERIMETER CONTROL METHOD AND SYSTEM FOR PREVENTING QUEUING OVERFLOW OF BOUNDARY LINKS

(71) Applicant: SHANDONG JIAOTONG UNIVERSITY, Shandong (CN)

(72) Inventor: Yajuan Guo, Jinan (CN)

(73) Assignee: SHANDONG JIAOTONG UNIVERSITY, Jinan (CN)

( * ) Notice: Subject to any disclaimer, the term of this patent is extended or adjusted under 35 U.S.C. 154(b) by 64 days.

(21) Appl. No.: 17/611,225

(22) PCT Filed: Jan. 7, 2021

(86) PCT No.: PCT/CN2021/070690

§ 371 (c)(1),
(2) Date: Nov. 15, 2021

(87) PCT Pub. No.: WO2022/037000

PCT Pub. Date: Feb. 24, 2022

(65) Prior Publication Data

US 2022/0366784 A1 Nov. 17, 2022

(30) Foreign Application Priority Data

Aug. 17, 2020 (CN) ......................... 202010826968.5

(51) Int. Cl.

| | |
|---|---|
| ***G08G 1/08*** | (2006.01) |
| ***G08G 1/01*** | (2006.01) |
| ***G08G 1/065*** | (2006.01) |

(52) U.S. Cl.

CPC ............. *G08G 1/08* (2013.01); *G08G 1/0125* (2013.01); *G08G 1/0145* (2013.01); *G08G 1/065* (2013.01)

(58) Field of Classification Search

CPC ...... G08G 1/08; G08G 1/0125; G08G 1/0145; G08G 1/065

See application file for complete search history.

(56) References Cited

FOREIGN PATENT DOCUMENTS

| | | | |
|---|---|---|---|
| CN | 101894477 A | | 11/2010 |
| CN | 103927890 A | * | 7/2014 |

(Continued)

OTHER PUBLICATIONS

Li Xin; "Study on Regional Road Network Perimeter Control Based on MFD;" Southwest Jiaotong University Master Degree Thesis; 2018.

(Continued)

*Primary Examiner* — Curtis A Kuntz
*Assistant Examiner* — James E Munion
(74) *Attorney, Agent, or Firm* — Oliff PLC

(57) ABSTRACT

A regional dynamic perimeter control method and system for preventing boundary links queuing overflow. The method includes: estimating the number of queuing vehicles of boundary links using a Kalman filtering extension method using traffic flow information, and calculating a maximum of receivable vehicles; dividing the boundary links utilizing an estimated number of each boundary link's queuing vehicles and the maximum number of receivable vehicles obtaining a boundary link set with sufficient storage and a boundary link set with insufficient storage; obtaining a critical accumulation of a region according to a preset Macroscopic Fundamental Diagram (MFD) model of the region, and predicting the estimated region accumulation in a sampling period; and controlling a regional boundary intersection traffic flow operation using a deviation between the predicted and critical accumulation and boundary link sets. Deterioration of regional traffic flow is avoided, and the probability of overflow of boundary links is reduced.

7 Claims, 2 Drawing Sheets

(56) References Cited

FOREIGN PATENT DOCUMENTS

| | | | | | |
|---|---|---|---|---|---|
| CN | 104392614 A | | 3/2015 | | |
| CN | 106355885 A | | 1/2017 | | |
| CN | 106504536 A | | 3/2017 | | |
| CN | 106960582 A | | 7/2017 | | |
| CN | 106971565 A | | 7/2017 | | |
| CN | 107507415 A | | 12/2017 | | |
| CN | 111091295 A | | 5/2020 | | |
| CN | 111932888 A | | 11/2020 | | |
| CN | 111932914 B | * | 5/2022 | ........... | G08G 1/0125 |
| DE | 34 31 059 A1 | | 3/1986 | | |
| GB | 2 374 243 B | | 6/2004 | | |

OTHER PUBLICATIONS

Jianmin et al.; "Perimeter traffic control strategy based on macroscopic fundamental diagrams;" Journal of Southeast University ( English Edition); 2017; pp. 502-510; vol. 33, No. 4.
May 11, 2021 Search Report issued in International Patent Application No. PCT/CN2021/070690.
May 11, 2021 Written Opinion of the International Searching Authority issued in International Patent Application No. PCT/CN2021/070690.
May 7, 2021 Office Action issued in Chinese Patent Application No. 202010826968.5.

* cited by examiner

REGIONAL DYNAMIC PERIMETER CONTROL METHOD AND SYSTEM FOR PREVENTING QUEUING OVERFLOW OF BOUNDARY LINKS

TECHNICAL FIELD

The present disclosure relates to the technical field of intelligent traffic, and in particular to a regional dynamic perimeter control method and system for preventing queuing overflow of boundary links.

BACKGROUND

The description in this section merely provides background information related to the present disclosure, and does not necessarily constitute the related art.

With the rapid development of economy and the continuous increase of vehicle holdings, traffic demands are increasingly prominent, and more and more urban roads are in severe short supply. Urban traffic congestion gradually tends to evolve from bottleneck points to arterial links and regional road networks, and the resulting regional traffic congestion has become a common problem in large and medium-sized cities in China. How to use traffic control and other means to control a regional traffic flow operation has become one of hot issues in the field of intelligent traffic system, avoiding regional traffic congestion and improving the efficiency of the traffic flow operation.

Regional perimeter control is one of effective methods for solving the problem of urban region traffic congestion. At present, there are various methods in the research of regional perimeter control over an urban road network. Researchers provide a macroscopic regional perimeter control method for urban traffic. According to a unimodal function relationship between the number of vehicles running in a region (or vehicle density) and an average traffic flow, a regional perimeter control proportion is calculated and then converted into a green split of a boundary intersection, and perimeter control of a plurality of homogeneous regions of the urban road network is realized. Researchers provide an urban regional perimeter control system. Starting conditions of perimeter control are determined by adopting an average speed of a road network. A flow interception point is selected according to information such as a real-time flow, a ratio of an output flow to an input flow, and an upstream road link speed. A green signal ratio thereof is obtained by calculating pressure exerted on each phase of an intersection. Accordingly, green time is allocated proportionally, and then signal timing of a boundary point is adjusted. Researchers propose a collaborative method of regional traffic perimeter control and guidance based on Internet of Things. Urban central and peripheral regions are divided into a plurality of sub-regions according to real-time traffic data, which are monitored by using a Macroscopic Fundamental Diagram (MFD). A perimeter control and guidance integration model based on system optimization is established. An optimal path and traffic control timing parameters are obtained.

The inventors of the present disclosure discover that the above schemes all relate to regional macroscopic traffic flow modeling and formulation of regional perimeter control schemes, but these studies do not pertinently solve the problem of queuing overflow of threshold boundary links, and implementation of a control strategy thereof may cause the congestion traffic flow of the boundary links to diffuse to upstream intersections.

SUMMARY

In order to solve the defects of the prior art, the present disclosure provides a regional dynamic perimeter control method and system for preventing queuing overflow of boundary links. Comprehensively applying flow interception and drainage control strategies and combining a real-time traffic state of boundary links of a congested region to dynamically adjust an input flow of a plurality of boundary intersections, a regional accumulation is maintained near a critical value, the situation deterioration of a regional traffic flow is actively avoided, and the occurrence probability of overflow of boundary links is reduced.

To achieve the foregoing objective, the following technical solutions are adopted in the present disclosure:

A first aspect of the present disclosure provides a regional dynamic perimeter control method for preventing queuing overflow of boundary links.

The regional dynamic perimeter control method for preventing queuing overflow of boundary links includes the following steps:

dynamically dividing boundary links according to obtained traffic flow information of the boundary links to obtain a boundary road section set with sufficient available storage space and a boundary road section set with insufficient available storage space;

obtaining a critical accumulation of a region according to a preset Macroscopic Fundamental Diagram (MFD) model of the region, and estimating a predicted accumulation of the region in a next sampling period; and dynamically controlling a traffic flow operation of a regional boundary intersection according to a deviation between the predicted accumulation and the critical accumulation and each boundary road section set.

Further, the number of queuing vehicles of the boundary links is estimated by adopting a Kalman filtering extension method, and a maximum total number of receivable vehicles of the boundary links is calculated.

The boundary links are dynamically divided by utilizing an estimated value of the number of queuing vehicles of each boundary road section and the maximum total number of receivable vehicles.

A second aspect of the present disclosure provides a regional dynamic perimeter control system for preventing queuing overflow of boundary links.

The regional dynamic perimeter control system for preventing queuing overflow of boundary links includes:

a dynamic division module, configured to dynamically divide boundary links according to obtained traffic flow information of the boundary links to obtain a boundary road section set with sufficient available storage space and a boundary road section set with insufficient available storage space;

an accumulation calculation module, configured to obtain a critical accumulation of a region according to a preset MFD model of the region, and predict a predicted accumulation of the region in a next sampling period; and a traffic flow operation control module, configured to dynamically control a traffic flow operation of a regional boundary intersection according to a deviation between the predicted accumulation and the critical accumulation and each boundary road section set.

A third aspect of the present disclosure provides a medium having stored thereon a program which, when executed by a processor, implements the steps of the regional dynamic perimeter control method for preventing queuing overflow of boundary links described in the first aspect of the present disclosure.

A fourth aspect of the present disclosure provides an electronic device, including a memory, a processor, and a program stored on the memory and executable on the processor. The processor, when executing the program, implements the steps of the regional dynamic perimeter control method for preventing queuing overflow of boundary links described in the first aspect of the present disclosure.

Compared with the related art, the present disclosure has the following beneficial effects:

1. According to the method, the system, the medium, and the electronic device of the present disclosure, by utilizing checkpoint data upstream and downstream of an urban road section, a method for predicting the number of queuing vehicles of regional boundary links based on Kalman filtering is proposed, and the number of queuing vehicles is compared with a maximum number of receivable vehicles to obtain a time-varying controlled boundary intersection set. On this basis, an MFD theory is adopted to actively evaluate the development trend of a regional traffic flow, calculate a deviation value between a regional real-time accumulation and a crucial value, and propose a signal timing optimization method of a dynamic boundary intersection according to a change condition of the deviation value, so that high-precision dynamic perimeter control of a congested region is realized.
2. According to the method, the system, the medium, and the electronic device of the present disclosure, comprehensively applying flow interception and drainage control strategies and combining a real-time traffic state of regional boundary links to dynamically adjust an input flow of a plurality of boundary intersections, a regional accumulation is maintained near a critical value, the situation deterioration of a regional traffic flow is actively avoided, and the occurrence probability of overflow of boundary links is reduced.

BRIEF DESCRIPTION OF THE DRAWINGS

The accompanying drawings constituting a part of the present disclosure are used to provide further understanding of the present disclosure. Exemplary embodiments of the present disclosure and descriptions thereof are used to explain the present disclosure, and do not constitute an improper limitation to the present disclosure.

DETAILED DESCRIPTION

The present disclosure is further described below with reference to the accompanying drawings and embodiments.

It should be noted that the following detailed descriptions are all exemplary and are intended to provide a further description of the present disclosure. Unless otherwise specified, all technical and scientific terms used herein have the same meaning as commonly understood by a person of ordinary skill in the art to which the present disclosure belongs.

It should be noted that terms used herein are only for describing specific implementations and are not intended to limit exemplary implementations according to the present disclosure. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

The embodiments in the present disclosure and features in the embodiments may be mutually combined in case that no conflict occurs.

As described in the BACKGROUND, the existing schemes do not pertinently solve the problem of queuing overflow of threshold boundary links. How to effectively utilize a real-time traffic state of regional boundary links and cooperatively regulate signal timing of a plurality of boundary intersections is a technical problem to be solved by regional perimeter control at the present stage.

Embodiment 1

Figure 1:
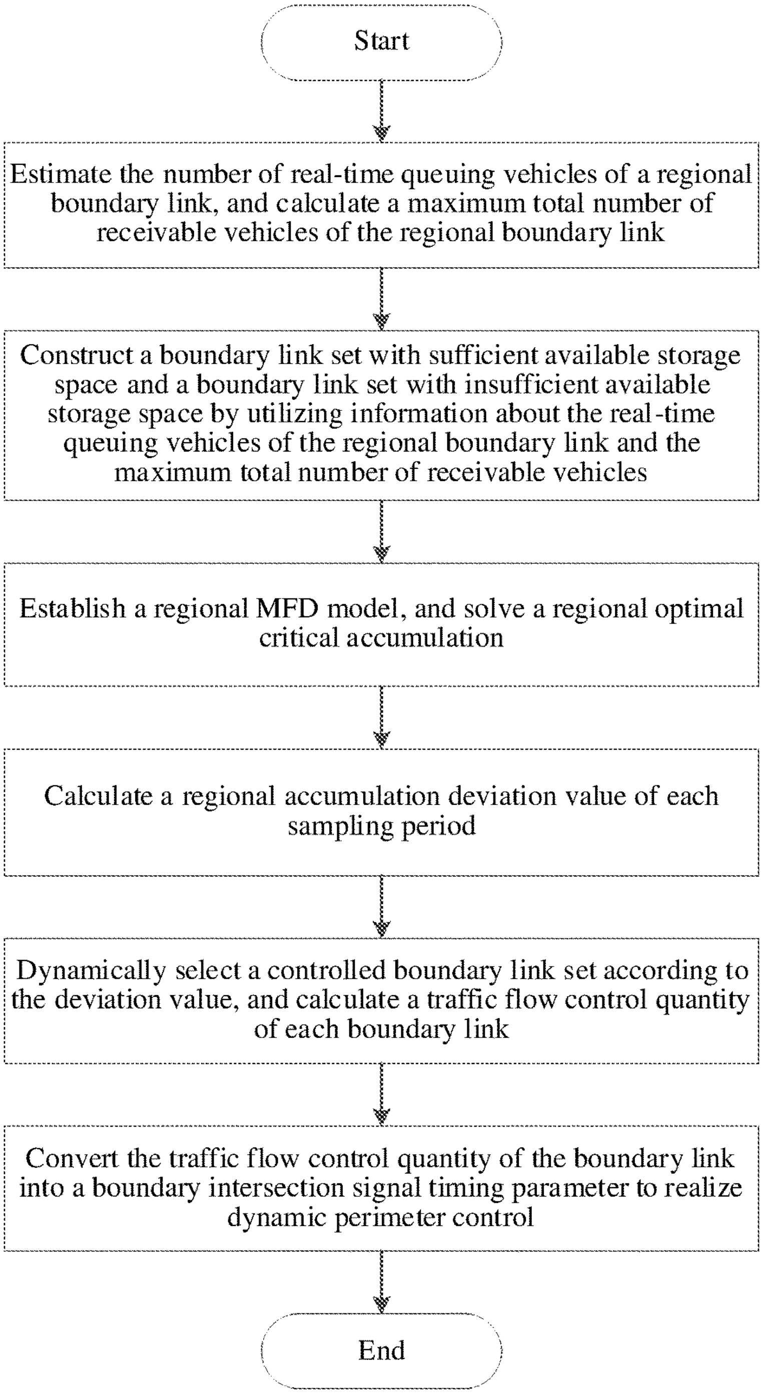
FIG. 1 is a schematic diagram of an implementation flow of a regional dynamic perimeter control method for preventing queuing overflow of boundary links according to Embodiment 1 of the present disclosure.

As shown in FIG. 1, Embodiment 1 of the present disclosure provides a regional dynamic perimeter control method for preventing queuing overflow of boundary links, which includes the following steps:

At S1, the number of queuing vehicles of regional boundary links in a next sampling period is estimated by adopting a Kalman filtering extension method, and a maximum total number of receivable vehicles of the boundary links is calculated.

At S2, the boundary links are dynamically divided by utilizing an estimated value of the number of queuing vehicles of each boundary road section and the maximum total number of receivable vehicles to obtain a boundary road section set with sufficient available storage space and a boundary road section set with insufficient available storage space.

At S3, an MFD model of an urban region is constructed, and a critical accumulation is determined.

At S4, an accumulation of the region in a next sampling period is predicted by utilizing the MFD model, and the accumulation is compared with a critical accumulation to obtain a regional accumulation deviation value.

At S5, a traffic flow operation of a regional boundary intersection is dynamically controlled according to the magnitude of the deviation value.

At S6, a regional perimeter control quantity is converted into a boundary intersection signal timing parameter to realize perimeter control.

S1 includes the following contents:

At S11, an upstream input flow and a downstream output flow of the boundary links are obtained by utilizing urban checkpoint data, occupation data of boundary links is obtained by utilizing a geomagnetic detector at the middle of boundary links, and the number of queuing vehicles $\hat{Y}_m(t+1)$ of the boundary links in the next sampling period is further predicted based on the Kalman filtering extension method:

$$\hat{Y}_m(t+1)=\hat{Y}_m(t)+T(a_m(t)-b_m(t))+K(Y_m(t)-\hat{Y}_m(t))$$

where $\hat{Y}_m(t)$ is a predicted queuing vehicle of a boundary link m in a $t^{th}$ sampling period; T is a sampling time interval; $a_m(t)$ is an upstream input flow of the boundary link m in the $t^{th}$ sampling period; $b_m(t)$ is a downstream output flow of the boundary link m in the $t^{th}$ sampling period; K is a Kalman gain; and $Y_m(t)$ is an estimated value of a queuing vehicle of the boundary link in based on geomagnetic data in the $t^{th}$ sampling period, specifically calculated as follows:

$$Y_m(t)=o_m(t)Q_m$$

where $o_m(t)$ is an occupation of the boundary link m detected based on geomagnetic data in the $t^{th}$ sampling period, and $Q_m$ is a maximum total number of receivable vehicles of the boundary road link m.

At S12, the maximum total number of receivable vehicles $Q_m$ of the boundary links is calculated by utilizing the length $l_m$ of the boundary links, the number of lanes $n_m$, and length $L_{veh}$ of effective queuing vehicles:

$$Q_m = \frac{l_m n_m}{L_{veh}}$$

In S2, the process of obtaining the boundary road link set with sufficient available storage space and the boundary link set with insufficient available storage space is as follows:

At S21, by comparing a predicted number of queuing vehicles $\hat{Y}_m(t+1)$ and a maximum number of receivable vehicles $Q_m$ of a boundary link, it is judged whether the boundary link overflows.

At S22, if $\hat{Y}_m(t+1)<Q_m$, m is classified into a boundary link set I(t) with sufficient available storage space, otherwise, m is classified into a boundary link set $\bar{I}(t)$ with insufficient available storage space, and all boundary links of the region are traversed in sequence to obtain I(t) and $\bar{I}(t)$.

In S3, an MFD model of the region is obtained by fitting through a least square method according to an accumulation of an urban region and output flow rate data, i.e. a unimodal MFD curve with low dispersion. At this moment, an accumulation corresponding to a peak value of the MFD curve is selected as the critical accumulation $M_{cri}$ of the region.

S4 includes the following contents:

At S41, a regional accumulation in a future $t+1^{th}$ sampling period is predicted by utilizing an MFD model:

$$M(t+1)=M(t)+R(t)-O(t)$$

where M(t) represents a regional real-time accumulation in the $t^{th}$ sampling period, R(t) represents a regional total input flow in the $t^{th}$ sampling period, and O(t) represents a regional total output flow in the $t^{th}$ sampling period.

At S42, a deviation value of the regional accumulation is a regional input flow to be regulated, specifically a difference value between the predicted accumulation M(t+1) and the critical accumulation $M_{cri}$ of the region:

$$S(t+1)=M(t+1)-M_{cri}$$

Figure 2:
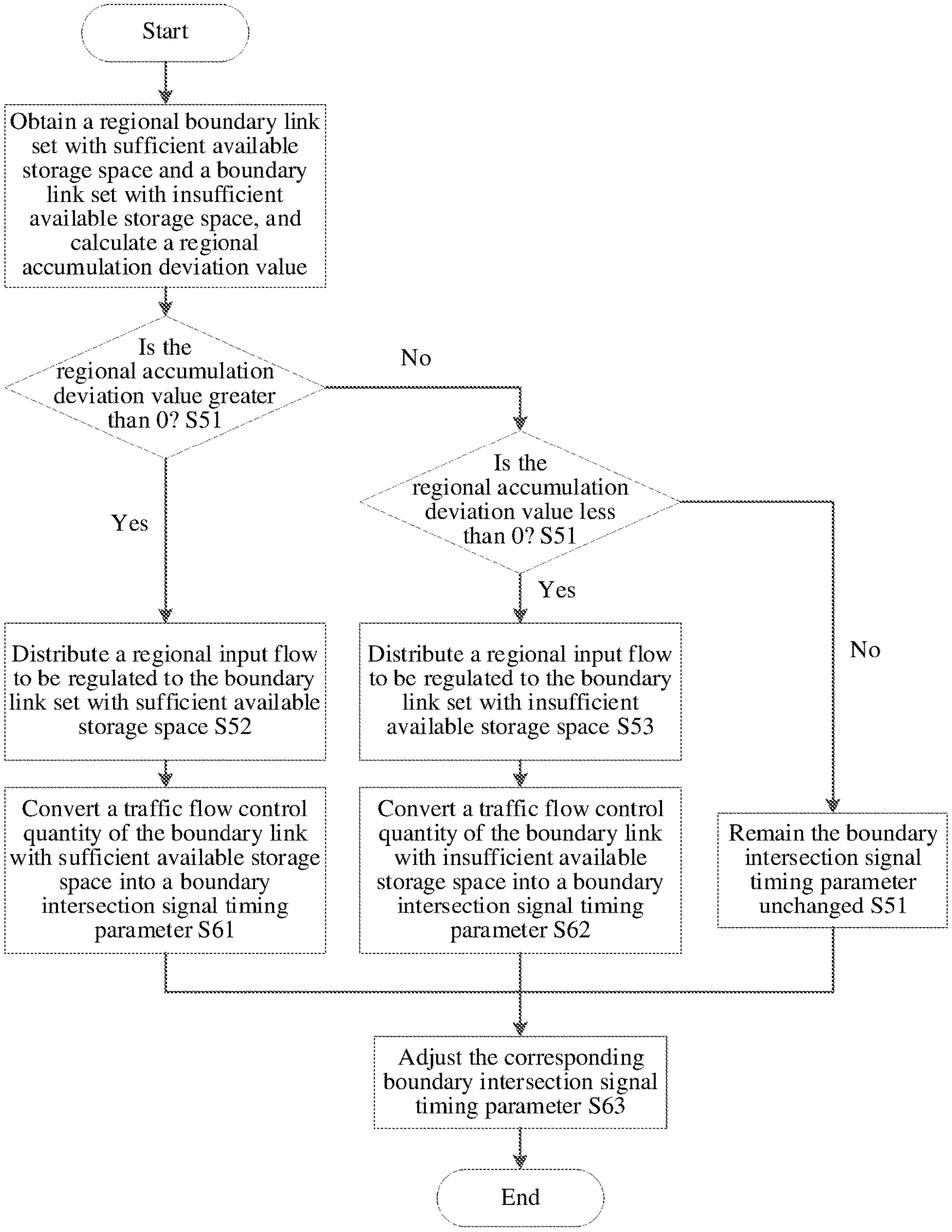
FIG. 2 is a flow diagram of a regional dynamic perimeter control method according to Embodiment 1 of the present disclosure.

In S5, it is essential to determine a region perimeter control scheme according to different region accumulation deviation values. Boundary signal control is not changed when the deviation value is zero. The boundary link set with sufficient available storage space is adopted for perimeter control when the deviation value is greater than zero. The boundary link set with insufficient available storage space is adopted for perimeter control when the deviation value is less than zero. Specific steps are shown in FIG. 2.

The following contents are included in detail:

At S51, the deviation value of the regional accumulation is the regional input flow to be regulated, the deviation value can reflect a traffic flow operation situation of a regional road network in real time, three control scenarios are divided according to a size relationship of the deviation value, and dynamic perimeter control is realized.

At S52, when the deviation value of the regional accumulation is greater than zero, it indicates that an input traffic flow of the regional road network needs to adopt a flow interception control strategy. At this moment, according to the real-time traffic flow and the residual queuing space of the boundary links, the regional input flow to be regulated is distributed to the boundary link set I(t) with sufficient available storage space.

The input flow $s_i(t+1)$ to be regulated in the boundary link $i\in I(t)$ with sufficient available storage space may be calculated by adopting the following formula:

$$s_i(t+1) = \min\left\{\frac{S(t+1)h_i(t)}{\sum_{r\in I(t)} h_r(t)},\ Q_i - \hat{Y}_i(t+1)\right\}$$

where $h_i(t)$ represents a real-time input flow of a boundary link i in the $t^{th}$ sampling period, $\Sigma h_r(t)$ represents the sum of real-time input flows of all road links in a boundary link set I(t) in the $t^{th}$ sampling period, $Q_i$ represents a maximum total number of receivable vehicles of the boundary road link i, and $\hat{Y}_i(t+1)$ represents a predicted value of queuing vehicles of the boundary link i in the $t+1^{th}$ sampling period.

At S53, when the deviation value of the regional accumulation is less than zero, it indicates that an input flow of the regional road network needs to adopt a drainage control strategy. At this moment, according to the number of lanes of the links, the regional input flow to be regulated is distributed to the boundary link set with insufficient available storage space.

The input flow $s_v(t+1)$ to be regulated in the boundary link $v\in\bar{I}(t)$ with insufficient available storage space may be calculated by adopting the following formula:

$$s_v(t+1) = \frac{S(t+1)n_v}{\sum_{r\in\bar{I}(t)} n_r}$$

where $n_v$ represents the number of lanes of a boundary link v, and $\Sigma_{v\in\bar{I}(t)}n_v$ represents the sum of lanes of all road links in the boundary link set $\bar{I}(t)$.

In S6, the deviation value of the regional accumulation is converted into a green light duration of a controlled boundary intersection by utilizing a real-time flow of the regional boundary links and available queuing space information, thereby realizing regional perimeter control.

The following contents are specifically included:

At S61, a green light duration adjustment value of an input direction of the boundary link i in the $t+1^{th}$ sampling period is calculated, i.e.:

$$\Delta g_i(t+1) = \frac{s_i(t+1)g_i(t)}{h_i(t)}$$

where $g_i(t)$ represents a green light duration of an input flow direction of the boundary link i in the $t^{th}$ sampling period.

The green light duration of the boundary link i in the future $t+1^{th}$ sampling period may be updated by adopting the following formula:

$$g_i(t+1)=g_i(t)-\Delta g_i(t+1)$$

At S62, the input flow to be regulated of the boundary link v is converted into a signal timing parameter of a corresponding boundary intersection, and the specific update formula is as follows:

$$g_v(t+1)=g_v(t)-s_v(t+1)\beta$$

where $g_v(t)$ represents a phase green light duration of an input direction of the boundary link v, and β represents a saturated time headway.

At S63, the signal timing parameter of the corresponding boundary intersection is dynamically adjusted according to green light duration update formulas under different control scenarios to obtain a green light duration of an input direction of a boundary link in a next sampling period.

Embodiment 2

Embodiment 2 of the present disclosure provides a regional dynamic perimeter control system for preventing queuing overflow of boundary links, which includes:

- a dynamic division module, configured to dynamically divide boundary links according to obtained traffic flow information of the boundary links to obtain a boundary link set with sufficient available storage space and a boundary link set with insufficient available storage space;
- an accumulation calculation module, configured to obtain a critical accumulation of a region according to a preset MFD model of the region, and predict a predicted accumulation of the region in a next sampling period; and
- a traffic flow operation control module, configured to dynamically control a traffic flow operation of a regional boundary intersection according to a deviation between the predicted accumulation and the critical accumulation and each boundary link set.

A working method of the system is the same as the regional dynamic perimeter control method for preventing queuing overflow of boundary links provided in Embodiment 1, and will not be described in detail here.

Embodiment 3

Embodiment 3 of the present disclosure provides a medium having stored thereon a program which, when executed by a processor, implements the steps of the regional dynamic perimeter control method for preventing queuing overflow of boundary links described in Embodiment 1 of the present disclosure. The steps include:

- dynamically dividing boundary links according to obtained traffic flow information of the boundary links to obtain a boundary link set with sufficient available storage space and a boundary link set with insufficient available storage space;
- obtaining a critical accumulation of a region according to a preset MFD model of the region, and estimating a predicted accumulation of the region in a next sampling period; and
- dynamically controlling a traffic flow operation of a regional boundary intersection according to a deviation between the predicted accumulation and the critical accumulation and each boundary road link set.

The detailed steps are the same as the regional dynamic perimeter control method for preventing queuing overflow of boundary links provided in Embodiment 1, and will not be described in detail here.

Embodiment 4

Embodiment 4 of the present disclosure provides an electronic device, including a memory, a processor, and a program stored on the memory and executable on the processor. The processor, when executing the program, implements the steps of the regional dynamic perimeter control method for preventing queuing overflow of boundary links described in Embodiment 1 of the present disclosure. The steps include:

- dynamically dividing boundary links according to obtained traffic flow information of the boundary link to obtain a boundary link set with sufficient available storage space and a boundary road link set with insufficient available storage space;
- obtaining a critical accumulation of a region according to a preset MFD model of the region, and estimating a predicted accumulation of the region in a next sampling period; and
- dynamically controlling a traffic flow operation of a regional boundary intersection according to a deviation between the predicted accumulation and the critical accumulation and each boundary link set.

The detailed steps are the same as the regional dynamic perimeter control method for preventing queuing overflow of boundary links provided in Embodiment 1, and will not be described in detail here.

A person skilled in the art should understand that the embodiments of the present disclosure may be provided as a method, a system, or a computer program product. Therefore, the present disclosure may use a form of hardware embodiments, software embodiments, or embodiments combining software and hardware. In addition, the present disclosure may use a form of a computer program product implemented on one or more computer-usable storage media (including but not limited to a disk memory, an optical memory, and the like) that include a computer-usable program code.

The present disclosure is described with reference to flowcharts and/or block diagrams of the method, device (system), and computer program product in the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of another programmable data processing apparatus to generate a machine, so that the instructions executed by the computer or the processor of another programmable data processing apparatus generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may also be loaded onto a computer or another programmable data processing device, so that a series of operations and steps are performed on the computer or another programmable device, thereby generating computer-implemented processing. Therefore, the instructions executed on the computer or another programmable device provides steps for implementing a specific function in one or more processes in the flowcharts and/or in one or more blocks in the block diagrams.

A person of ordinary skill in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The foregoing storage medium may be a magnetic disc, an optical disc, a read-only memory (ROM), a random access memory (RAM), or the like.

The foregoing descriptions are merely preferable embodiments of the present disclosure, but are not intended to limit the present disclosure. The present disclosure may include various modifications and changes for a person skilled in the art. Any modification, equivalent replacement, or improvement made within the spirit and principle of the present disclosure shall fall within the protection scope of the present disclosure.

What is claimed is:

1. A regional dynamic perimeter control method for preventing queuing overflow of boundary links, comprising the following steps:

dynamically dividing boundary links according to obtained traffic flow information of the boundary links to obtain a boundary link set with sufficient available storage space I(t) and a boundary link set with insufficient available storage space I(t);

obtaining a critical accumulation of a region according to a preset Macroscopic Fundamental Diagram (MFD) model of the region, and estimating a predicted accumulation of the region in a next sampling period; and dynamically controlling a traffic flow operation of a regional boundary intersection according to a deviation between the predicted accumulation and the critical accumulation and each boundary link set, wherein when the deviation between the predicted accumulation and the critical accumulation of the region is zero, a boundary signal control is not changed;

when the deviation is greater than zero, indicating that an input traffic flow of the regional road network needs to adopt a flow interception control strategy, the boundary road link set with sufficient available storage space is adopted for perimeter control, at this moment, according to the real-time traffic flow and the residual queuing space of the boundary links, a regional input traffic flow to be regulated is distributed to the boundary link set with sufficient available storage space I(t), wherein:

the steps further include calculating the regional input traffic flow to be regulated in the boundary link with sufficient available storage space I(t) by adopting the following formula:

$$s_i(t+1)=\min\{\Sigma_{r\in I(t)}h_r(t)/S(t+1)h_i(t),Q_i-\hat{Y}_i(t+1)\}$$

where $h_i(t)$ represents a real-time input traffic flow of a boundary link i in the $t^{th}$ sampling period, $\Sigma h_r(t)$ represents the sum of real-time input traffic flows of all road links in the boundary link set I(t) in the $t^{th}$ sampling period, $Q_i$ represents a maximum total number of receivable vehicles of the boundary link i, and $\hat{Y}_i(t+1)$ represents a predicted value of queuing vehicles of the boundary link i in the $t+I^{th}$ sampling period; and when the deviation is less than zero, indicating that the input traffic flow of the regional road network needs to adopt a drainage control strategy, the boundary link set with insufficient available storage space $\bar{I}(t)$ is adopted for perimeter control, at this moment, according to the number of lanes of the links, the regional input traffic flow to be regulated is distributed to the boundary link set with insufficient available storage space $\bar{I}(t)$, wherein:

the steps further include calculating the regional input traffic flow to be regulated in the boundary link with insufficient available storage space $\bar{I}(t)$ by adopting the following formula:

$$s_v(t+1)=\Sigma_{r\in I(t)}n_r/S(t+1)n_v$$

wherein, $n_v$ represents the number of lanes of a boundary link v, and $\Sigma_{v\in\bar{I}(t)}n_v$ represents the sum of lanes of all road links in the boundary link set $\bar{I}(t)$; and converting, by utilizing the real-time flow of the boundary links of the region and available queuing space information, the deviation between the predicted accumulation and the critical accumulation of the region into a green light duration of a controlled boundary intersection, comprising:

calculating a green light duration adjustment value of an input direction of the boundary link in a $t+I^{th}$ sampling period:

$$\Delta g_i(t+1)=h_i(t)/s_i(t+1)g_i(t)$$

wherein $g_i(t)$ represents a green light duration of an input flow direction of the boundary link i in the $t^{th}$ sampling period;

then, converting the regional input traffic flow to be regulated of the boundary link into a signal timing parameter of a corresponding boundary intersection, and the specific update formula is as follows:

$$g_v(t+1)=g_v(t)-s_v(t+1)\beta$$

wherein $g_v(t)$ represents a phase green light duration of an input direction of the boundary link v, and β represents a saturated time headway; and then, dynamically adjusting the signal timing parameter of the corresponding boundary intersection according to green light duration update formulas under different control scenarios to obtain a green light duration of an input direction of a boundary link in the next sampling period.

2. The regional dynamic perimeter control method for preventing queuing overflow of boundary links of claim 1, wherein the number of queuing vehicles of the boundary links is estimated by adopting a Kalman filtering extension method, and a maximum total number of receivable vehicles of the boundary links is calculated; and the boundary links are dynamically divided by utilizing the estimated number of queuing vehicles of each boundary link and the maximum total number of receivable vehicles.

3. The regional dynamic perimeter control method for preventing queuing overflow of boundary links of claim 2, wherein the number of queuing vehicles of the boundary links in the next sampling period is predicted based on the Kalman filtering extension method according to an obtained upstream input flow, downstream output flow and middle occupation data of the boundary links;

or, the maximum total number of receivable vehicles of the boundary links is calculated by utilizing the lengths of the boundary links, the number of lanes, and length information of the queuing vehicles;

or, the boundary link set with sufficient available storage space $I(t)$ and the boundary link set with insufficient available storage space $\bar{I}(t)$ are obtained in the following manners:

comparing a predicted number of queuing vehicles and a maximum number of receivable vehicles of a boundary road link, and judging whether the boundary road link overflows;

if the predicted number of queuing vehicles at a next moment is less than the maximum number of receivable vehicles, classifying the road link into the boundary link set with sufficient available storage space $I(t)$, otherwise, classifying the road link into the boundary link set with insufficient available storage space $\bar{I}(t)$; and traversing all boundary link of the region in sequence to obtain the boundary link set with sufficient available storage space $I(t)$ and the boundary link set with insufficient available storage space $\bar{I}(t)$.

4. The regional dynamic perimeter control method for preventing queuing overflow of boundary links of claim 1, wherein the predicted accumulation in the next sampling period is that the sum of a regional real-time accumulation in a current sampling period and the regional input total flow in the current sampling period minus a regional output total flow in the current sampling period.

5. The regional dynamic perimeter control method for preventing queuing overflow of boundary links of claim 1, wherein a green light duration adjustment value of an input direction of a controlled boundary link is a ratio of an input traffic flow of the controlled boundary link required to be regulated to a traffic flow rate of the boundary link.

6. A non-transitory computer readable medium having stored thereon a program which, when executed by a processor, implements the steps of the regional dynamic perimeter control method for preventing queuing overflow of boundary links of claim 1.

7. An electronic device, comprising a memory, a processor, and a program stored on the memory and executable on the processor, wherein the processor, when executing the program, implements the steps of the regional dynamic perimeter control method for preventing queuing overflow of boundary links of claim 1.

* * * * *